Aug. 25, 1936.  E. L. BAILEY  2,052,010
INDUCTION HEATING APPARATUS
Filed Aug. 4, 1934
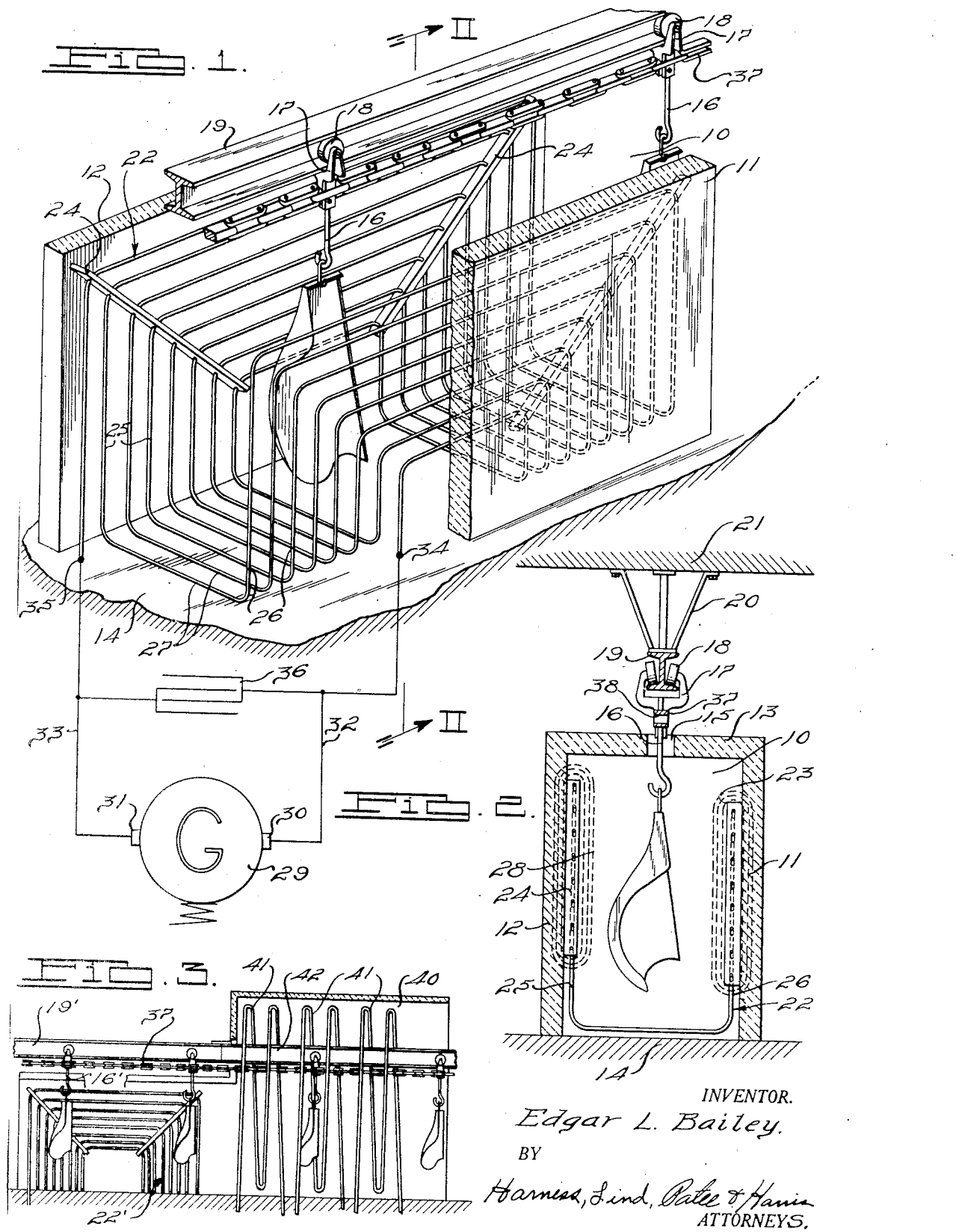
INVENTOR.
Edgar L. Bailey.
BY
Harness, Lind, Patee & Harris
ATTORNEYS.

Patented Aug. 25, 1936

2,052,010

UNITED STATES PATENT OFFICE 2,052,010

INDUCTION HEATING APPARATUS

Edgar L. Bailey, Birmingham, Mich., assignor to Chrysler Corporation, Detroit, Mich., a corporation of Delaware Application August 4, 1934, Serial No. 738,502

8 Claims. (Cl. 219—13)

This invention relates to improved induction heating apparatus.

Heretofore it has been the practice to inductively heat articles by moving them progressively through the interior of an induction coil comprising completely closed loops of a conductor. The articles have in some instances been carried through the coil by conveying apparatus which either extended into or passed through the magnetic field of the core. When these conveyors comprise ferrous metal structures, they consume some of the flux of the coil and are heated, and as a result the conveying structure is in time injured and energy supplied to the coil is uselessly wasted while in many instances the magnetic flux of the coil is diverted from the path of the articles under treatment. The direction of the flow of the magnetic flux of the coils of this character is from end to end of the coil, and since the articles are generally moved longitudinally of the coil the flux flows mainly in a direction parallel to the direction of travel of the articles. All portions of some articles of irregular shapes are not subjected throughout to the same flux density and they are, therefore, not uniformly heated when the path of the flux and the movement of the articles have this relationship.

One of the main objects of this invention is to provide an improved induction coil in a heating apparatus which has a relatively long flux path through which articles may be progressively moved by conveying apparatus disposed externally of the coil and spaced a considerable distance from the flux path thereof.

Another object of the invention is to provide an induction coil in apparatus of this kind which creates a magnetic flux flowing transversely of the direction of the movement of articles through the coil.

A further object of the invention is to provide, in a path through which articles to be heated are conveyed, a magnetic field having its flux flowing transversely of the direction of the movement of the articles and an adjacent magnetic field having flux flowing substantially parallel to the direction of movement thereof so as to subject the articles to flux flowing in diverse directions and to uniformly heat all portions of irregular articles.

Other objects of the invention are to provide in a heating apparatus a channel shaped induction coil having open ends through which articles to be heated may be moved and having an open side for accommodating the passage of moving supports for such articles; to provide a coil having an open side in conjunction with which conveying apparatus comprising magnetically permeable metal, such as iron and steel, may be used without subjecting the conveying apparatus to the heating influence of the magnetic field of the coil and without deviating the course of the flux away from the articles to be heated so as to prevent useless consumption of the flux in heating large masses of structure other than the articles desired to be heated; and to provide a heating apparatus having an overhead conveyor located externally of an induction coil and adapted to move articles to be heated longitudinally of the coil.

The above being among the objects of the present invention, the same consists in certain novel features of construction and combination of parts to be hereinafter described with reference to the accompanying drawing and then claimed, having the above and other objects in view.

An illustrative embodiment of the invention is shown in the accompanying drawing wherein:

Fig. 1 is a fragmentary perspective view of a heating apparatus equipped with my improved induction coil and showing portions broken away to disclose the underlying structure.

Fig. 2 is a transverse vertical sectional view taken on the line II—II of Fig. 1.

Fig. 3 is a longitudinal sectional view of a heating apparatus embodying a further development of the invention.

In the form shown in Figs. 1 and 2, the improved heating apparatus includes a compartment 10 in which articles are adapted to be heated, having spaced side walls 11 and 12 and upper and lower walls 13 and 14, respectively, the ends of the heating compartment being preferably open. The walls 11, 12, 13 and 14 preferably comprise refractory material, and the upper wall 13 is provided with a longitudinally extending slot for accommodating the extension of article supports 16 into the interior of the heating compartment and movement of such supports longitudinally thereof.

The article supports 16, shown in Figs. 1 and 2, include yoke-shaped upper extremities 17 on the opposite arms of which rollers 18 are journaled. The rollers 18 are adapted to seat upon the lower flange of an I-beam 19 which is suspended by braces 20 from an overhead supporting structure 21. The I-beam or rail 19 and the supporting structure 21, as well as the main portion of the article holders 17 are spaced sufficiently from the interior of the heating compartment to protect them from the heat thereof.

Mounted in the heating compartment 10 is an induction coil, generally designated by the numeral 2 having a plurality of turns of a conductor so constructed and arranged as to provide a coil 22 with a channel shaped cross section, as shown in Fig. 2, having a longitudinally extending opening 23 registering with the longitudinally extending slot 15 of the top wall of the compartment 10. The open side 23 of the coil 22 permits extension of the lower end of the article holder 16 into the interior of the coil and accommodates the movement of the lower end of the article holder and articles to be heated supported thereby throughout the length of the coil, as illustrated in Fig. 1.

The conductor of which the coil is formed is threaded through successive apertures of cleats 24 which are mounted on the side walls 11 and 12 of the compartment 10, and the loops or turns of the coil have laterally spaced portions 25 and 26 lying in planes substantially parallel to the side walls 11 and 12, and they have intermediate portions 27 disposed in a plane adjacent the lower wall or floor 14 of the compartment. The coil 22 may, for the purpose of analysis of the flux created thereby, be considered to be a flat pancake coil of which opposite side portions are bent upwardly from an intermediate portion to provide a channel. Magnetic flux created by a flat pancake coil flows mainly in paths parallel to the plane in which the turns of the coil are disposed, and when the sides of such a coil are disposed in the relation shown in Figs. 1 and 2, the flux still continues to flow in the same direction with respect to the planes of the sides of the turns of the coil which, as illustrated by the dotted lines 28 in Fig. 2, is in a direction transverse to the length of the channel of the coil and transverse to the direction of movement of the articles therethrough.

The coil 22 is preferably energized by an alternating current generator 29 having terminals 30 and 31 connected by conductors 32 and 33 with the opposite ends 34 and 35, respectively, of the conductor of which the coil is formed. A condenser 36 may, if desired, be connected in parallel with the conductors 32 and 33 as illustrated in Fig. 1.

When the coil 22 is energized by an alternating current, a magnetic field is created having lines of flux substantially following the paths illustrated by dotted lines 28 in Fig. 2. This magnetic field inductively heats any article comprising magnetic permeable metal, for example iron or steel, which is either suspended in or moved through the interior of the coil and compartment 10. One of the factors determining the temperature to which the articles are raised is the length of time they are subjected to the action of the magnetic field, and this may in practice, be predetermined by the rate of movement of the articles. The articles may be moved at a selected speed by a driven conveyor chain 37, of the type illustrated in Figs. 1 and 2, which has spaced links attached to spaced article supports 16 in any suitable manner such, for example, as by passing one of the links of the chain through an aperture 38 provided in each of the article holders 16.

In a heating apparatus having a coil of the foregoing character, all of the conveying apparatus and the main portions of the article supports may be disposed in spaced relation to the magnetic field of the coil so as to guard against heating of this structure and useless consumption of energy as well as to prevent distortion of the flux path away from the articles to be heated. When the articles under treatment are of certain irregular shapes, the movement thereof in a direction with respect to which the flux flows transversely is found to be highly desirable because all portions of the articles are more uniformly heated.

In the form of the invention shown in Fig. 3, the heating apparatus includes an elongated heating chamber 40 in which is disposed an induction coil 22' which is substantially identical to the induction coil 22 shown in Figs. 1 and 2. That portion of the heating chamber 40 in which the coil 22' is disposed may be constructed in accordance with the design illustrated in Figs. 1 and 2 in which case the roof of the compartment may be provided with a longitudinally extending slot. Arranged in the chamber 40, in series relationship with the induction coil 22', are three conventional continuous loop type induction coils 41 which are preferably connected with a three phase source of alternating current (not shown). A single induction coil of this character may be employed if desired and excited by a single phase alternating current. A continuous conveying mechanism including a supporting rail is disposed over the end of the heating chamber 40. This conveying mechanism includes a ferrous metal rail section 19' over the portion of the chamber 40 in which the induction coil 22' is located and a rail section 42 which preferably comprises nonmagnetic metal, such as aluminum, which extends through the interior of the conventional loop type coils 41. The rails 19' and 42 are connected in end to end relation and adapted to support movable article holders 16' which are substantially identical to the article holders 16 shown in Figs. 1 and 2. The article holders are retained in a predetermined spaced relation and moved longitudinally of all of the coils by a conveyor chain 37 to which they are attached.

The magnetic flux of the coil 22' flows, as described in discussion of the coil 22, transversely of the length of the coil and transversely of the direction of movement of the articles which are moved longitudinally of the coil, and the flux of the coils 41 flow longitudinally of the compartment 40 and in the direction of movement of the articles. Therefore, those portions of an article of irregular contour which are not uniformly heated by the flux of the coil 22' are subjected to a further magnetic flux which flows in a different direction.

Although but several specific embodiments of the invention are herein shown and described, it will be understood that various changes in the size, shape and arrangement of parts may be made without departing from the spirit of my invention, and it is not my intention to limit its scope other than by the terms of the appended claims.

What I claim is:

1. An induction heating coil comprising a plurality of turns, some of said turns having opposed portions deflected to form a channel and other portions extending in a longitudinal direction and forming opposed wall portions of said channel whereby predetermined magnetic flux paths are provided between portions of said opposed walls of said channel.

2. An induction heating coil comprising a plurality of turns, some of said turns having opposed portions deflected to form a channel, said deflected portions extending substantially in the general direction of the depth of said channel for establishing predetermined magnetic flux paths extending lengthwise of said channel, other portions of the turns of said coil extending longitudinally of the latter for forming opposed wall portions of said channel and for establishing magnetic flux paths extending depthwise of said channel.

3. An induction heating coil comprising a plurality of turns, some of said turns having spaced pairs of opposed parts deflected to form a channel, said deflected parts being located at the end portions of said channel and extending in the general direction of the depth thereof for establishing magnetic flux paths extending lengthwise of said channel and located at the end portions thereof, the other parts of said turns between said deflected parts extending longitudinally of said channel and forming opposed wall portions thereof for establishing magnetic flux paths intermediate said flux paths at the end portions of said channel and extending depthwise thereof.

4. An induction heating coil comprising a plurality of turns, some of said turns having portions deflected into angular relationship with respect to adjacent portions thereof and other portions of said turns extending in a longitudinal direction and forming one wall of a passage for accommodating articles to be treated, said angularly disposed turn portions establishing magnetic flux paths in angularly related intersecting planes.

5. An induction heating coil comprising a generally flat pancake type coil of the character which normally has a plurality of concentric turns in a single plane and at diverse distances from its axis, some of said turns having opposed portions deflected to form a channel and other portions extending in a longitudinal direction and forming opposite wall portions of said channel for establishing magnetic flux paths in angularly disposed planes.

6. Heating apparatus including an enclosure, a conveyor so associated with said enclosure as to move articles throughout a predetermined course therein, and an induction heating coil in said enclosure comprising a plurality of turns of which opposed portions are deflected to form a channel common with the course of travel of said articles, other portions of said turns extending longitudinally of said channel and forming the opposed walls thereof for subjecting said articles to magnetic flux paths extending depthwise of said channel.

7. Heating apparatus including a conveyor for moving articles in suspended relation throughout a predetermined course, and an induction heating coil comprising a plurality of turns of which opposed portions are deflected to form a channel common with the course of movement of said articles and having an open side so associated with said conveyor as to accommodate movement of said articles longitudinally of said channel, other portions of said turns extending longitudinally of said channel and forming the opposed walls thereof for subjecting said articles to magnetic flux paths extending depthwise of said channel in a direction transverse to their thickness.

8. Heating apparatus including an enclosure, a conveyor so associated with said enclosure as to move articles throughout a predetermined course therein, and an induction heating coil comprising a plurality of turns, some of said turns having portions deflected into angular relationship with respect to adjacent portions thereof and other portions of said turns extending longitudinally of the course of movement of said articles for establishing magnetic flux paths in angularly related intersecting planes along said course of movement of said articles.

EDGAR L. BAILEY.